E. J. GREENFIELD.
METHOD OF IMPLANTING ARTIFICIAL DENTURE ROOTS.
APPLICATION FILED SEPT. 13, 1912.
1,216,683.
Patented Feb. 20, 1917.
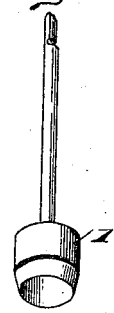
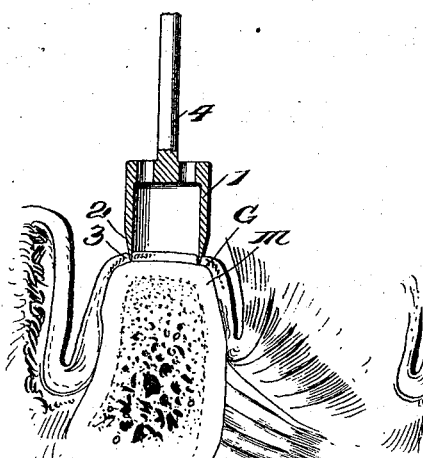
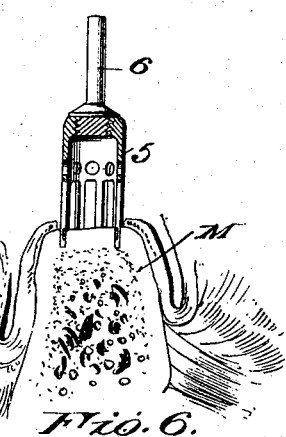
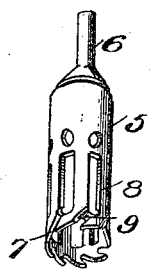
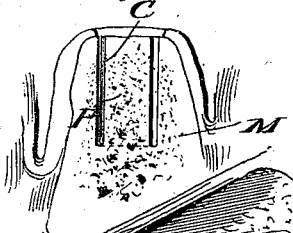
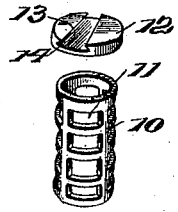
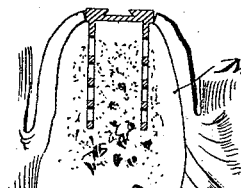
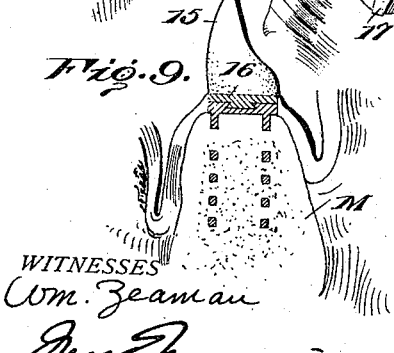
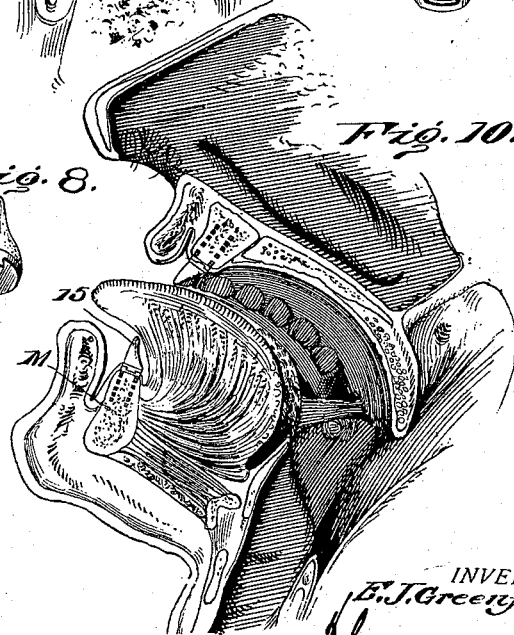
WITNESSES
Wm. Zeaman
INVENTOR
E. J. Greenfield.
Attorneys

UNITED STATES PATENT OFFICE.

EDWIN J. GREENFIELD, OF WICHITA, KANSAS.

METHOD OF IMPLANTING ARTIFICIAL DENTURE-ROOTS.

1,216,683.  Specification of Letters Patent.  Patented Feb. 20, 1917.

Application filed September 13, 1912. Serial No. 720,218.

*To all whom it may concern:*

Be it known that I, EDWIN J. GREENFIELD, citizen of the United States, residing at Wichita, in the county of Sedgwick and State of Kansas, have invented certain new and useful Improvements in Methods of Implanting Artificial Denture-Roots, of which the following is a specification.

This invention aims to disclose a novel method of implanting artificial tooth roots in the maxilla and mandible bones of the jaw.

It is well-known that the results of the implantation of natural teeth are generally unsatisfactory, principally for the reason that in a comparatively short length of time the roots become absorbed and the work is destroyed. While it has been proposed to implant in the maxilla and mandible, artificial roots, carrying a crown, the methods employed in implanting such roots, have not been productive of results which would warrant their universal application. Chief among the disadvantages presented by previously proposed methods of implanting artificial roots are the instability of the work and the liability of producing a diseased condition of the jaw-bones. Of the methods previously proposed that one which seems to possess the fewer disadvantages and to be productive of the best results consists, briefly stated, in forming in the jaw-bone a cavity produced by drilling into the bone, and in securing within the cavity a frame which constitutes the artificial root, this frame having a cap to which is applied the base of the crown. While the wall of bone surrounding the root will in time to a greater or less extent fill in the interstices in the root, the anchorage thus secured is by no means as stable as is to be desired. The present invention therefore contemplates disclosing a method of preparing the maxilla or mandible bones for the insertion of the artificial root, which method will insure of a stable anchorage of the root in the bone without the use of mechanical securing devices, cement, or the like.

Further the invention aims to disclose a method such as above mentioned, the carrying out of which will not result in cavities or spaces in the bone after the insertion of the artificial root and the completion of the process by a natural complete embedment of the artificial root in the bone tissue.

For a full understanding of the invention reference is to be had to the following description and accompanying drawing, in which:—

Figure 1 is a perspective view of the instrument first used in carrying out the process of the present invention.

Fig. 2 is a view illustrating a section through the mandible and showing the manner in which the instrument shown in Fig. 1 is to be used in carrying out the first step in the method.

Fig. 3 is a view similar to Fig. 1 illustrating the instrument next used in carrying out the method.

Fig. 4 is a view similar to Fig. 2 illustrating the manner of using the instrument shown in Fig. 3.

Fig. 5 is a view illustrating a view through the mandible after its treatment by the instrument shown in Fig. 3.

Fig. 6 is a perspective view of the artificial root employed, the cap for the root being shown detached.

Fig. 7 is a view through the mandible and the root, the latter being in place in the mandible.

Fig. 8 is a perspective view of a crown provided with a base adapted to fit the cap of the root shown in Figs. 6 and 7.

Fig. 9 is a view similar to Fig. 7 illustrating the crown applied to the root and also illustrating the manner in which the root has become naturally completely embedded in the bone tissue.

Fig. 10 is a sagittal sectional view illustrating the cavity of the mouth and the maxilla and mandible bones in both of which artificial roots have been embedded by the process of this invention.

Corresponding and like parts are referred to in the following description and indicated in all the views of the accompanying drawing by the same reference characters.

As before stated, in Figs. 2, 4, 5, 7 and 9 the mandible bone is shown in cross-section and it is indicated by the reference letter M, the gum ensheathing the bone being indicated by the reference letter G. The instrument first used in carrying out the process is shown in Fig. 1 of the drawing and is in the nature of a circular knife comprising a hollow cylindrical body 1 having its lower portion tapered as at 2 so as to form a cutting edge 3. A shank 4 projects from the upper end of the body and is adapted for insertion in the chuck of a dental engine, In using this knife, its cutting edge is disposed upon the upper surface of the gum G at the point at which it is desired to locate the artificial root, and the knife, while rotating is allowed to cut through the gum until its cutting edge comes in contact with the upper side of the mandible. The gum tissue within the bounds of the circular cut thus made is extirpated, exposing a circular area of the mandible.

The instrument used in carrying out the next step of the method is clearly shown in Figs. 3 and 4 and comprises a crown saw, the body of which is indicated by the numeral 5. While this saw is fully described in and forms the subject-matter of my copending application, filed Sept. 13, 1912, Serial No. 720,217 it may here be briefly stated that the body 5 is frusto-conical in form and at its upper end is provided with a shank 6 for insertion of the chuck of a dental engine. The lower end of the body, which is its major end, is formed with an annular series of teeth 7. The wall of the body is formed with a number of slots 8 which constitute pockets to receive bits of bone and tissue cut by the teeth 7, the spaces between the teeth being placed in communication with the pockets 8 by means of channels 9. In using the instrument, above previously described, its toothed end is disposed against the exposed surface of the mandible, while the saw is being rotated, and the saw is fed into the bone to a depth equal to or slightly greater than the total depth of the artificial root to be embedded in the mandible. It is of course to be understood that the gums are to be treated prior to the first described step in the operation, with such local applications as the operator deems necessary to place them in proper condition for the operation, and that after the crown saw has been used, the annular cavity formed thereby may be thoroughly cleansed by a suitable dental syringe.

By referring to Fig. 5 of the drawing it will be observed that the saw produces an annular cavity indicated by the reference letter C, which cavity surrounds a pillar P of bone, this cavity being formed between the walls of the cut.

The artificial root which is to be inserted within the cavity C may be formed of foraminous material or from wire, but in any event is in the nature of a cylindrical body 10, the wall of which is formed with a number of openings or interstices 11. The root is formed from platinum, gold, silver or some other non-corrosive material and is provided with a cap 12 which may either be integral therewith or soldered thereto, and which is formed with a wedge-shaped socket 13, the walls of which are undercut as at 14 as shown in Figs. 6 and 7. The crown to be applied to the root is indicated by the numeral 15 and is provided with a base 16 which is preferably of the same material as the cap 12 and this base upon its under side is formed with a wedge-shaped tongue 17 arranged to snugly fit within the socket 13 in the cap 12. After the cavity C and pillar P have been formed by the use of the saw 5 and the cavity has been cleansed, the artificial root 10 is fitted into the cavity with the cap 12 resting on the upper end of the pillar P in the manner shown in Fig. 7 of the drawing, the wall of the root being of a thickness substantially equal to the width of the cavity. The base of the crown may then be fitted to the cap of the root, whereupon the operation is complete. After a short time the bone tissue forming the walls of the cavity C will knit through the interstices 11 in the artificial root so that all of the interstices will be filled as shown in Fig. 9 of the drawing and the root is in this manner firmly anchored in place, its complete embedment in the bone tissue being accomplished naturally.

From the foregoing it will be seen that by proceeding in accordance with the method hereinbefore described, an artificial root such as shown in the drawings may be securely embedded in the maxilla or the mandible bones without the use of mechanical anchoring devices and without leaving openings or cavities.

It will be apparent that the pillar P serves as a firm anchor for the root and provides for stable anchorage of the root without weakening the structure of the bone, inasmuch as after the complete embedment of the root in the bone has been accomplished naturally, no spaces or openings will be left.

Having thus described the invention what is claimed as new is:—

In prosthetic dentistry, that method of artificial denture implantation which consists in forming in the maxilla or mandible bones a pillar and a surrounding cavity and fitting to the said pillar and in the cavity an intersticed denture root and allowing the bone to knit through the interstices of the root.

In testimony whereof I affix my signature in presence of two witnesses.

EDWIN J. GREENFIELD. [L. S.]

Witnesses:
SAMUEL N. ACKER,
J. D. YOAKLEY.